United States Patent [19]

Sweetland

[11] Patent Number: 5,394,910
[45] Date of Patent: Mar. 7, 1995

[54] GLASS GOB DROP GUIDE FUNNEL ASSEMBLY

[75] Inventor: James E. Sweetland, Decatur, Tex.

[73] Assignee: Union Oil Company of California, Los Angeles, Calif.

[21] Appl. No.: 953,726

[22] Filed: Sep. 29, 1992

Related U.S. Application Data

[63] Continuation-in-part of Ser. No. 937,343, Aug. 27, 1992, abandoned.

[51] Int. Cl.$^6$ ................................. C03B 9/30
[52] U.S. Cl. ........................ 141/98; 141/331; 141/340; 65/304
[58] Field of Search .......... 141/1, 82, 331, 332, 141/340, 341, 342; 65/62, 165, 181, 221, 304, 374.15

[56] References Cited

U.S. PATENT DOCUMENTS

| | | | |
|---|---|---|---|
| 1,807,336 | 5/1931 | Clark | 65/304 X |
| 2,020,627 | 11/1935 | Stenhouse | 65/304 |
| 2,507,753 | 5/1950 | Blackhurst | 65/304 |
| 2,758,421 | 8/1956 | Smith | 65/304 |
| 3,672,860 | 6/1972 | Keller | 65/304 X |
| 3,857,691 | 12/1974 | Jones et al. | 65/304 X |

FOREIGN PATENT DOCUMENTS 992473 10/1957 France ................ 141/341

OTHER PUBLICATIONS

Glassmate ® Applications and specification sheets, POCO Graphite, Inc., Jan. 1992 May 1992.
"Glass Engineering Handbook", Second Edition, McGraw Hill, by E. B. Shand, Chapter 8, pp. 163–175, 1958.

Primary Examiner—Ernest G. Cusick
Attorney, Agent, or Firm—Gregory F. Wirzbicki; William O. Jacobson

[57] ABSTRACT

A graphite funnel inserted into a metal funnel support sleeve guides hot glass gobs from a furnace to the glass blowing mold. The graphite insert is adjustable by set screws and is easily repositioned. The graphite insert has an outer diameter slightly less than the metal retainer to allow ambient air to pass upwardly past it.

35 Claims, 2 Drawing Sheets

GLASS GOB DROP GUIDE FUNNEL ASSEMBLY

CLAIM FOR PRIORITY, INCORPORATION BY REFERENCE

This application is a continuation-in-part of co-pending U.S. patent application Ser. No. 07/937,343, filed on Aug. 27, 1992, now abandoned. This prior filed application is incorporated in its entirety herein by reference.

FIELD OF THE INVENTION

This invention relates to methods of making blown glass articles, particularly to methods of apportioning molten glass for making blown glass articles. More particularly this invention relates to guide funnels for glass gobs.

BACKGROUND

Machines make glass bottles by placing a portion of molten glass, or a "gob" of glass, into a mold and pressing and/or blowing air or other gas into the center of the gob. This causes the hot glass to expand to the side of the mold and take on the shape of the mold. Before the glass is introduced into and formed in the mold, the raw glass must first be heated in a furnace normally located above the mold. The hot glass gob is conditioned (or cooled slightly) in a fore-hearth to a temperature consistent with a glass viscosity suitable for the forming operation. The glass is then dropped down through the fore-hearth and into the mold for forming, e.g., blowing. The fore-hearth extrudes hot molten glass that is cut into substantially uniformly weighted, but non- spherically shaped glass gobs produced intermittently.

The glass gobs drop from the fore-hearth into a guide funnel, which keeps the gobs oriented and may shape them to properly engage a gob scoop and the mold. The gobs typically fall a distance ranging from about 6 to 24 inches (15.24 to 60.96 cm). The gobs have a tendency to tip as they fall and it is beneficial to have a funnel means of correcting their attitude before entering a gob scoop and placement into a blank mold. After passing through the funnel and the gob scoop, the gobs are typically directed to placement into one of a plurality of molds by means of troughs. After placement into a mold, the gobs are blown or otherwise formed into a product shape.

The funnel must withstand an extreme environment. The interior must contact intermittent molten glass gobs that can range in temperature up to about 2300° F. (1260° C.) for typical glass compositions, up to about 2732° F. (1500° C.) or more for high silica content glasses. Typically, the (softening) temperature of the glass gobs ranges from about 2000° to 2200° F. (1093° to 1204° C.), but may be as low as about 1500° F. (816° C.).

Glass gobs are typically cylindrical in form and sheared from a flow of molten glass as it exits from the fore-hearth, the glass gobs having weights ranging from about ¼ to 3½ pounds (0.113 to 1.59 kg), but more typically in the range from about ½ to 1½ pounds (0.227 to 0.680 kg). The gob's representative diameter can range from about ¾ to 2 inches (1.91 to 5.08 cm). The number of gobs passing through a given funnel typically ranges from 80–150 per minute or 4800–9000 per hour. These frequencies and extreme gob temperatures, sizes, weights, and dropping energies of the gobs are interspersed with exposure to ambient air temperatures ranging up to about 200° F. (93.3° C.), typically about 150° F. (65.6° C.) because of the proximity of the furnace.

The kinetic energy of the gobs being dropped, when combined with the intermittent high temperature shock of the gobs, tends to damage the interior of almost any funnel. Materials that can withstand continuous exposure to the glass gob temperatures tend to be brittle and subject to cracking when exposed to thermal and structural shock. Even if cracking or other failures are avoided, cooling of the funnel at the exterior surface (or at internal cooling passages) is needed to maintain the structural integrity of many funnel materials of construction at these high temperature conditions. Presently, metallic funnels must be cooled well below the temperatures of the glass gobs. This is typically accomplished by circulating large volumes of water in external jackets.

Some recently developed funnels are composed of carbon fitted for forced air cooling instead of water. The carbon funnels have been machined with a plurality of baffles or fins to achieve sufficient cooling using forced air. The baffles or fins protrude into the forced air stream at least about ⅛ inch (0.318 cm).

However, these funnels erode in this harsh environment. Typically, the erosion is not equally distributed around the circumference of the funnel, but tends to be in one angular location. The angular location of maximum erosion is primarily a function of funnel location and orientation with respect to the fore-hearth. These location specific failure modes have resulted in a shortened useful life and costly replacement of funnels.

It would be advantageous to have a funnel that did not need to be replaced as frequently and that did not need to be cooled by fluids driven by mechanical means and/or require the complicated machined cooling passage/baffle/fin shapes required by forced air cooling.

SUMMARY OF THE INVENTION

In this invention, a metal funnel support sleeve holds a graphite funnel liner that guides hot glass gobs from a fore-hearth to a glass gob scoop or other device leading to a forming device. The operator can easily reposition and replace the liner. The bottom of the graphite liner has an outside diameter less than the inside diameter of the metal support sleeve to allow natural circulation of air to pass upwardly past the graphite insert.

More specifically, an aspect of this invention is the non-protruding exterior shape of the graphite glass gob liner and the substantial lack of forced fluid cooling of the exterior shape. The liner exterior comprises a substantially tube-shaped monolithic piece of graphite having: a) a cylindrical top collar portion, the underside of the collar terminating in a bearing ledge; and b) a generally cylindrical bottom portion having an outside diameter less than the outside diameter of the collar portion. The outermost or exterior surface of the liner portions (i.e., the surface at the outside diameter of each portion) does not need to be cooled by forced circulation of water and/or air stream(s) and also does not require protruding fins or baffles into the cooling stream(s).

A second aspect of this graphite glass gob funnel assembly is an outer cylindrical support sleeve. The graphite funnel is disposed within the support sleeve. The support sleeve has an outside diameter similar to the collar portion of the graphite liner. The ledge of the collar portion rests on the support sleeve portion in a substantially vertical orientation.

Another aspect of this invention is the interior surface of the graphite funnel. The interior funnel surface forms a interior passageway penetrating the liner and narrowing from top, defined by a top end diameter greater than at a bottom end internal diameter, and a cylindrical interior bottom portion. The bottom portion can be cut-off, radially repositioned, and/or laterally repositioned to direct glass gobs from a furnace to one or more variable location molds.

DETAILED DESCRIPTION OF THE INVENTION

Figure 1:
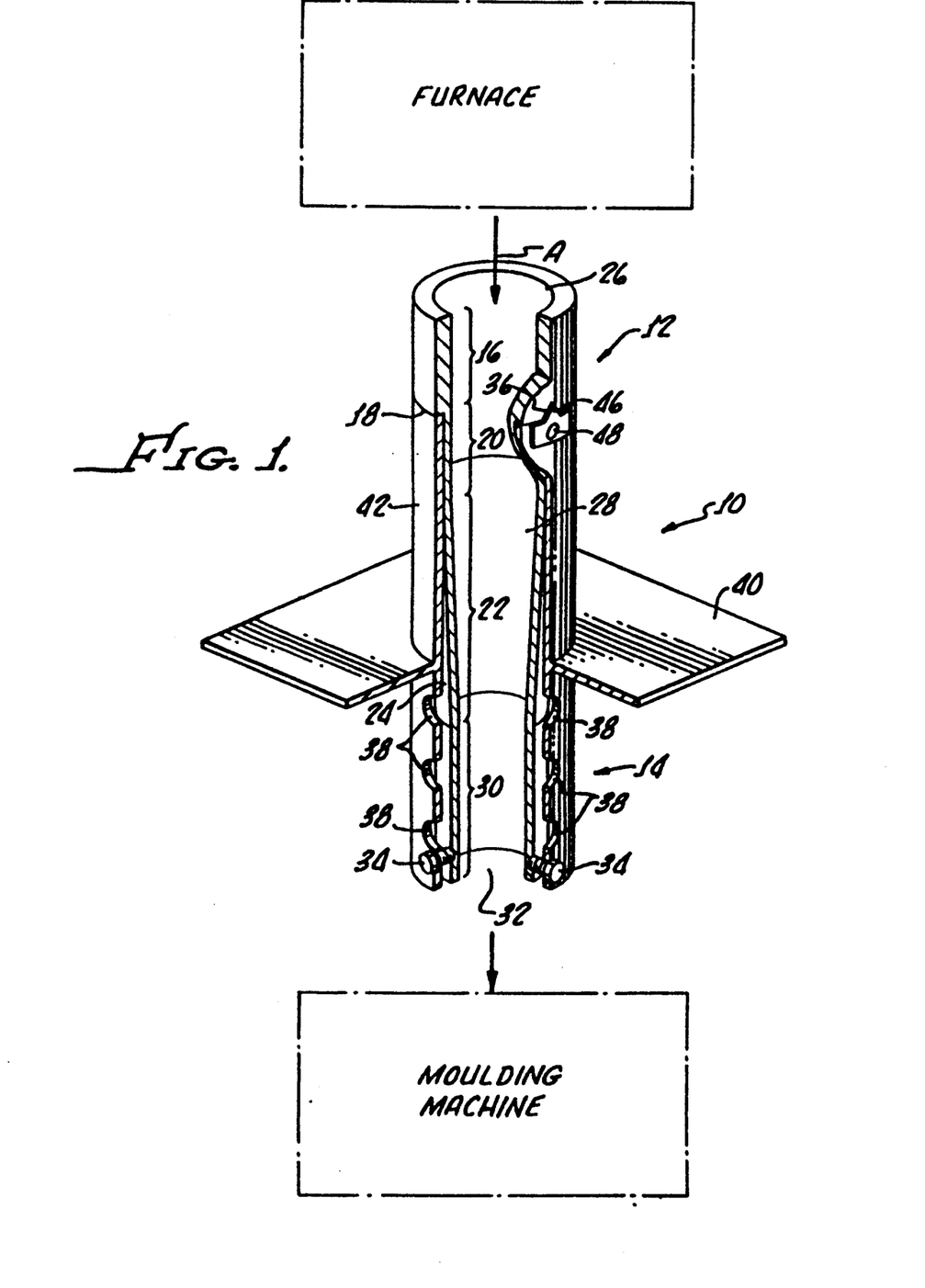
FIG. 1 is a partial cut away perspective drawing of the glass gob guiding funnel assembly of this invention.

Referring to FIG. 1, a glass gob guiding funnel assembly 10 embodiment of the invention is shown. The funnel assembly 10 includes a funnel liner 12 and a support sleeve 14. A collar 16 of the funnel liner 12 terminates in a bearing ledge 18 that is retained on the upper edge of the support sleeve 14. Glass gobs fall into the funnel liner 12 from a fore-hearth (located above, not shown) into a receiving orifice 26 that introduces the glass gobs into a conical well interior surface 28 to be directed to a mold (located below, not shown) through a delivery orifice 32.

The outside diameter of the collar 16 and outside diameter of the support sleeve 14 are shown to be approximately equal, but differences in the outside diameters of these components are also possible. The preferred embodiment has an outside collar diameter between 95% and 110% of the outside diameter of the support sleeve, assuring that the funnel liner 12 can be supported by the support sleeve 14. The similar outside diameters also tend to simplify space allocation for the funnel assembly 10 and avoid protrusions likely to cause handling damage. Other, substantially non-protruding exterior shapes for the funnel liner 12 would accomplish a similar purpose and are also possible.

The exterior length of the substantially cylindrical collar 16 is a function of the locations of the fore-hearth, the mold(s), and the associated machinery. The exterior length of the collar 16 is also a function of the material strength and thermal characteristics of the collar 16. The length of the collar 16 must extend sufficiently towards the fore-hearth to reliably encompass the dropping glass gobs, distribute the supporting loads from the bearing ledge or surface 18, and allow grasping of the funnel liner 12 for removal or reorientation. However, the collar length must not be so large as to present an obstruction, prevent easy replacement and handling, or interfere with the molding operation. For the preferred funnel liner material of GLASSMATE-SR ®, supplied by Poco Graphite, Inc., the collar lengths may range from as little as about ½ to as much as 2.0 inches (1.27 to 5.08 cm), but more preferably ranges from about 1 to 2 inches (2.54 to 5.08 cm) for a nominal outside diameter of 2⅞ inches (7.303 cm). For a larger nominal outside collar diameter of 4 inches (10.16 cm), the collar length may change, but is still expected to range from about ½ to 2 inches (1.27 to 5.08 cm). Another way of expressing these collar dimensions is that the ratio of the length of the collar to the outside diameter ranges from about 0.125 to 0.70 for the preferred materials of construction.

The collar 16 (and all of the funnel liner 12) is preferably composed of a GLASSMATE-SR ® graphite material supplied by Poco Graphite, Inc. located in Decatur, Tex. Table 1 provides typical physical properties of the preferred GLASSMATE-SR ® material. This material, combined with the conical interior and tubular exterior shape of funnel liner 12, provides a smooth surface and good directional control without scratching the glass gobs. The material and the design also provide good resistance to the harsh temperature and erosive environment without the need for forced air cooling or exterior-protruding heat exchange surfaces such as fins or baffles. Alternative materials of construction include GLASSMATE ® and GLASSMATE-LT ®, also supplied by Poco Graphite Inc.

A key physical property of the preferred GLASSMATE-SR ® material is a relatively high thermal conductivity of at least 70 BTU-ft/ft$^2$-hr-°F., even at elevated temperatures. In contrast, carbon and graphite materials for high temperature service only have an average thermal conductivity of 8 BTU-ft/ft$^2$-hr-°F. (per Chemical Engineers'Handbook, by Perry and Chilton, Fifth Edition, 1973). In addition, many graphite materials are anisotropic, having even lower thermal conductivities in some directions. A thermal conductivity of at least 50 BTU-ft/ft$^2$-hr-°F., preferably at least 60 BTU-ft/ft$^2$-hr-°F., for the funnel liner materials of construction minimizes hot spots and avoids the need for forced air or water cooling with fins or baffles. The external length and outer surface diameter of collar 16 (when composed of high thermal conductivity graphite) provide a sufficient surface area for cooling by natural convection of the ambient air.

TABLE 1

| TYPICAL ROOM TEMP. PHYSICAL PROPERTIES OF GLASSMATE-SR ® | |
|---|---|
| Property (at room temp) | Typical Value |
| Density (g/cc) | 1.82 |
| Hardness (Shore Scleroscope) | 65 |
| Flexural Strength (psi) | 9,000 |
| (Kg/cm$^2$) | 633 |
| Compressive Strength (psi) | 16,000 |
| (Kg/cm$^2$) | 1,125 |
| Thermal Conductivity (BTU-ft/ft$^2$-hr-°F.) | 76 |
| (Cal-cm/cm$^2$-sec-°C.) | 0.27 |
| Coefficient of Thermal Expansion | 8.2 |
| TYPICAL HIGH TEMP. PHYSICAL PROPERTIES OF GLASSMATE ® | |
| Property at 572° F. (300° C.) | Typical Value |
| Density (g/cc) | 1.8 |
| Hardness (Shore Scleroscope) | 65 |
| Flexural Strength (psi) | 9,000 |
| (Kg/cm$^2$) | 633 |
| Compressive Strength (psi) | 16,000 |
| (Kg/cm$^2$) | 1,125 |
| Thermal Conductivity (BTU-ft/ft$^2$-hr-°F.) | 70 |
| (Cal-cm/cm$^2$-sec-°C.) | 0.25 |
| Coefficient of Thermal Expansion | 8.1 |

Another key property of GLASSMATE-SR ® is a flexural strength of 9,000 psi which is relatively high for graphite. A flexural strength of at least 8,000 psi, preferably at least 8,800 psi, allows the funnel liner 12 to be easily handled without damage, repositioned, and secured at different positions. Its strength also allows the funnel liner to be deformed somewhat to adjust the location of a discharge orifice 32 with respect to the fore-hearth and/or mold, e.g., the funnel liner shape can be distorted without cracking.

The flexural strength of GLASSMATE-SR ® allows the funnel liner 12, including the supporting collar 16, to be supported over a small area of the substantially single piece or monolithic construction. Instead of a broad area of support to minimize flexural stresses, a small ledge 18 area on the collar 16 is sufficient to support even a deformed funnel liner 12.

Another key property of GLASSMATE-SR ® is its high density (and associated low porosity) of about 1.82 g/cc. A liner material density of at least about 1.77 g/cc, preferably at least about 1.8 g/cc, results in a smooth, hard surface on the interior of the funnel liner 12 after machining so that the deflected glass gobs can be formed without damage (after they enter the mold).

These combined graphite properties and the repositionable design result in undamaged gob delivery, low erosion rates, and infrequent repositioning required. For gob delivery rates of at least about 4800 per hour, repositioning is expected to be required no more than about two times per year, preferably less than about once per year.

The inside surface of collar 16 of the funnel liner 12 shown in FIG. 1 is a right circular cone frustrum, conically narrowing downward. The glass gobs fall in direction "A" towards the funnel liner 12. In order to control the velocity of the gobs and/or cool the interior of the funnel, a flow of air (or another fluid) may also be generally directed in direction "A" (for acceleration of the gobs) or an opposite direction (for deceleration). The cone angle of the funnel liner can vary widely, but is generally no more than 10 degrees and typically in the range from about 6 to 8 degrees. This angle provides a smooth transition between the entry and outlet of the funnel liner.

The smooth and downwardly narrowing internal geometry is primarily a function of the length of the funnel liner 12. A cone extending most of the length of funnel 12 provides a greater interior contact surface and time for the dropping glass gob to conform to the location and diameter of the exit orifice 32.

The geometry of the inlet orifice 26 of collar 16 is primarily a function of the location and size of the glass gobs dropping from the fore-hearth. If a flow of air of other fluid in direction "A" is used to accelerate glass gobs, the inlet orifice size would also have to accommodate this flow. Although the inlet orifice 26 size can vary widely, expected circular orifices are expected to range from about 2.5 to 3.75 inches (6.35 to 9.525 cm) in diameter for nominal 1½ pound (0.68 kg) glass gobs having a substantially cylindrical diameter in a range from about ¾ to 2 inches (1.91 to 5.08 cm). Alternative geometries for the inlet orifice 26 may include elliptical, rectangular, and triangular shapes.

Alternative funnel interior surfaces may include a substantially straight upper tubular portion (prior to a conical narrowing), a narrowing pyramidal shape (e.g., extending from a triangular orifice) instead of a truncated cone, or a segment of a paraboloid of revolution instead of the cone. In any of these alternative geometries, a major dimension of the inlet orifice 26 is expected to be larger than a corresponding dimension of the discharge orifice 32 of the funnel liner 12.

In the preferred embodiment shown, the funnel liner 12 includes a cylindrical section 20 below the collar 16 that fits within a corresponding portion of the support sleeve 14 over a relatively short length. The typically metallic support sleeve 14 not only supports the funnel liner 12 (at bearing ledge 18), but shields and protects the majority of the exterior surface of the graphite funnel liner from damage by moving objects. The outer diameter of the funnel liner's cylindrical section 20 is smaller than the outer diameter of the collar 16 by an amount equal to twice the thickness of a narrow ledge 18. The length may be longer if increased lateral loads and support is needed, e.g., if the funnel axis is non-vertical. If the cylindrical section 20 is in contact with the support sleeve 14, the contacted support sleeve 14 portion prevents full exposure of the outer surface of the cylindrical section 20 directly to the ambient air, precluding unobstructed natural convection heat transfer from the funnel liner 12 at this surface. The obstruction tends to increase the temperature of the funnel liner 12 at this surface. However, the relatively high thermal conductivity of the funnel liner material, natural convection cooling at the exterior surface, and the thermal contact with the cylindrical section 20 tends to dissipate any increased temperature at this surface.

In order to maintain the funnel liner 12 centered on bearing ledge 18 and circumferential thermal contact between the support sleeve 14 and the cylindrical section 20, the outer diameter of the cylindrical section 20 preferred embodiment mates with the inner diameter of the support sleeve 14. This can be achieved by roundness and dimensional tolerances on these diameters to assure an interference (or force) fit, press fit, or sliding fit.

If a variable and resettable positioning of the funnel liner's collar 16 with respect to the support sleeve 14 is desired, the outer diameter of the cylindrical section 20 is dimensioned to be less than the inside diameter of the support sleeve 14. Centering, if required, is obtained by positioning the resettable funnel liner 12 within the support sleeve 14 using set screws 34.

Below the relatively short cylindrical section 20 is a conical narrowing portion 22 that provides a bottom gap 24 between the support sleeve 14 and the bottom portions of funnel liner 12. The bottom gap 24 allows ambient air to enter from below and cool the funnel liner by natural convection, similar to the natural convection cooling of collar 16 previously described. Again, this cooling is in the absence of any substantial number or extent of protrusions such as fins or baffles. To aid in the natural circulation of the (heated) air in bottom gap 24 after the air contacts the funnel liner 12, apertures 38 have been provided in the support sleeve 14. Although no theoretical limitation exists for the width of bottom gap 24, an average gap width of at least about ⅛ of an inch (3.175 mm) along a majority of the length of the bottom gap 24 is expected to be needed for adequate natural convection cooling, preferably at least about 5/32 of an inch (3.97 mm).

The conical narrowing portion 22 terminates in a straight guiding portion or tube portion 30 that delivers the glass gobs through a delivery orifice 32 to a gob scoop leading to molds. The length of the tube portion 30 can be varied to accommodate various fore-hearth to mold distances, allowing the gob scoop to be more easily positioned with respect to its proximity to the fore-hearth. Overall length of the funnel assembly 10 would therefore vary with the length of the tube portion 30, preferably ranging from about 6 to 20 inches (15.24 to 50.8 cm).

Variations in fore-hearth to gob scoop distances can also be accommodated by removing a portion of the variable length tube portion 30. Even if the tube portion 30 is mostly removed, the conical shape is maintained since the internal passageway of this portion is cylindrical.

Because the gob scoop distance variations can be accommodated by changes in tube portion 30 length changes, the funnel assembly can be modularized with many common portions. For example, four modular styles of funnel assemblies, having an overall length of about 6, 10, 15, and 20 inches (15.24, 25.4, 38.1, and 50.8 cm) respectively, could accommodate typical mold distance variations. Each of these assemblies could have a common collar, ledge, cylindrical and narrowing portions with similar internal passageways. Each of these length sizes could also be made in, for example, three different internal passageway geometries and outer diameters. Modular construction would standardize fabrication, minimize cost, and allow the components to be cut to a particular size meeting a specific customer's mold size and distance requirements.

An operator can adjust the radial position of the funnel liner 12 and deflect the delivery of the glass gobs to the molds by a series of set screws 34 mounted at different distances above the bottom of the support sleeve 14 radially around the support sleeve 12. Especially if the longitudinal axis of funnel liner 12 is non-vertical or deformed by the set screws 34, the interior of the funnel liner 12 may have uneven wear caused by the glass gobs impacting one spot repeatedly as the glass gobs pass to the mold.

To correct any unevenness in wear, the collar 16 has a series of grooves 36 spaced around the bearing ledge 18 of the collar 16. These set the funnel liner 12 in one specific circumferential and radial orientation with respect to the support sleeve. As one portion of the interior of the funnel liner 12 becomes worn, the set screws 36 can be retracted and the funnel liner 12 rotated. The grooves 36 engage a ridge member or other protrusion 46 mounted on the top of the support sleeve 14. It will of course be realized that the number of grooves and protrusions could be varied. As the interior of the funnel liner 12 starts to show undue wear at any orientation, the operator can periodically release, rotate, and resecure the funnel liner 12. Periods between rotations would vary with each application, but are expected to be in the range from about 26 to 50 weeks, more typically 30 to 40 weeks. In this manner, the uneven wear caused by the passage of the hot gobs of glass in the interior of the funnel liner 12 is evened out.

Alternatively, the support sleeve 14 could have grooves and the funnel liner 12 have an engaging ridge. The engaging ridge of the funnel liner would not necessarily be composed of graphite material, but may be a pin (or a plurality of pins) imbedded in the graphite. Each of the support sleeve's grooves would mate with the imbedded pin in one position, allowing the funnel to be rotated to other positions where another groove would mate with the imbedded pin.

The passage of hot glass gobs also heats the funnel liner 12, especially at the narrowest portions, to a high temperature. Funnel liner 12 temperatures at the interior surface as high as the glass gobs themselves (e.g., 2200° F. or 1204° C.) are possible, but these temperatures can weaken and/or cause thermal gradients in the funnel liner 12. To reduce thermal gradients, only ambient air directly cools the majority of the exterior surface of funnel liner 12. The ambient air flows around the outer diameter of collar 16 and around the straight guiding tube and narrowing sections 30 and 22 of liner 12 in the bottom gap or space 24. The space 24 is relatively unimpeded by baffles or fins and natural convection heating of the air next to the graphite funnel liner 12 causes the heated air to rise and flow through the apertures 38. The apertures 38 allow hot air within the support sleeve 14 to pass to the outside and be replaced by cooler ambient air from below. Average air velocity across the funnel surface due to this natural convection is expected to be less than about 7 feet per second (2.13 meters/sec), preferably less than about 2 feet per second (0.61 meters/sec).

The use of ambient air (instead of forced air or water cooling) and the absence of funnel liner fins or baffles, increases exterior surface temperatures of the funnel liner 12 and decreases thermal gradients within the funnel liner 12. The increased funnel temperature and decreased thermal gradients also tend to minimize thermal gradients in the glass gobs, reducing damage and cracking tendencies in both the molded glass product and the funnel liner 12.

Mounting flange 40 attaches the support sleeve 14 to a machine (not shown) or related equipment that molds the glass gobs into bottles (or other products). The mounting flange 40 secures the support sleeve 14 to the molding machine or other equipment. The support sleeve 14 is not eroded by the glass gobs and need not be replaced once it is assembled; only the funnel liner 12 need be replaced because of erosion.

After retracting the set screws 36, an operator can easily slip the funnel liner 12 into and out of the support sleeve 14 without undue disruption of the production of bottles or other formed glass product. The funnel assembly 10 can generally substitute for currently used forced air or water cooled funnels, and can be used as a full retrofit or replacement part for those funnels.

Figures 2, 3:
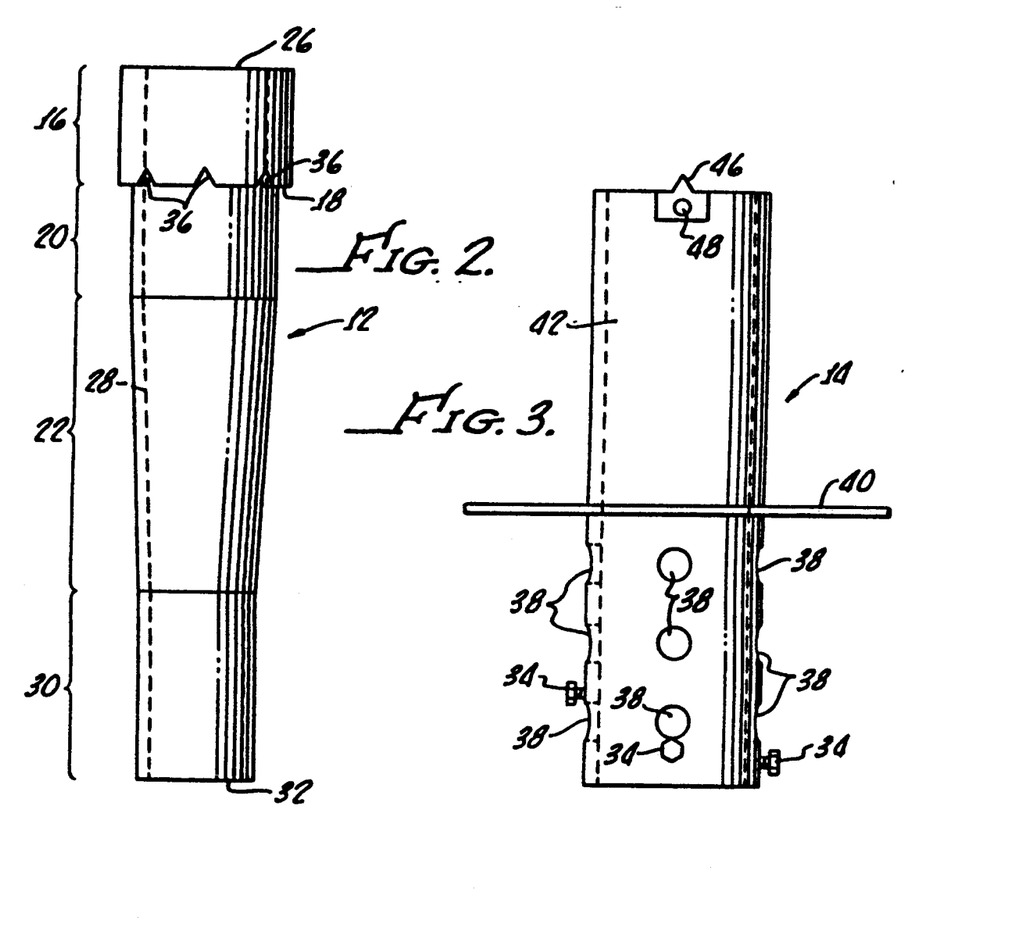
FIG. 2 is an elevational view of the glass gob funnel liner of this invention.
FIG. 3 is an elevational view of the outer support sleeve of the glass gob funnel assembly of this invention.

Referring to FIG. 2, the funnel liner 12 is a mostly cylindrical, substantially monolithic graphite construction having, at its top, a collar 16 having a bearing surface 18 that is engageable with the top edge of the support sleeve 14 (see FIG. 3) and a top surface including a receiving orifice 26 that leads to the interior, conical well surface of the funnel liner 12. The collar 16 has a plurality of grooves 36 that can engage the ridge member 46 mounted on support sleeve 14 (see FIG. 3). The overall height of the funnel liner 12 is typically greater than 4.0 times the dimension of the outside diameter of the collar 16 of the funnel liner. The bottom of the collar 16 ends with a small bearing ledge 18 having an inside diameter that is typically between 2% and 10% less than the outside diameter of the collar and, preferably, has grooves 36 cut across the entire width of ledge 18. The difference in diameter and ledgewidth grooves allow off-center placement of the funnel liner 12 in the support sleeve 14. The depth of grooves 36 is expected to range from about 0.188 to 0.250 inches (0.478 to 0.635 cm) to allow significant non-parallel axial placement of the funnel liner 12 on the support sleeve 14.

The cylindrical section 20 extends beneath the collar 16 for a short distance. The outer surface of the cylindrical section 20 is cylindrical and may or may not be in contact with the inner surface of the support sleeve 14 as shown. A thermal insulating material can also be sandwiched between the support sleeve and funnel liner surfaces if the temperature of the contacting support sleeve 14 becomes excessive. In the preferred embodiment, the short length of the cylindrical section 20 can provide a bearing surface which, in combination with the close tolerance fit, supports and centers the funnel liner 12. The length of the cylindrical bearing surface extends below the bearing ledge 18 and, preferably, is between 0.5 and 2.0 times the width of the bearing ledge 18. The bearing support at this interface would be in addition to any support and centering provided by the set screws 36.

In an alternative embodiment, the set screws 36 are deleted. A close tolerance fit between the outside surface of cylindrical section 20 and support sleeve 14 centers and retains the funnel liner 12 without the need for set screws 36. Off center placement and support can also be achieved by shims placed between the cylindrical section 20 and the support sleeve 14. If the funnel liner 12 must be deformed to provide a curved path from the fore-hearth to the gob scoop without set screws 36, the deformation may be accomplished by other means, for example, a gob scoop protrusion deforming the funnel liner 12.

Returning to the embodiment shown in FIG. 2, below the cylindrical section 20 is a conical narrowing section 22 that results in the bottom gap 24 forming between the support sleeve 14 and the funnel liner 12 as the outside diameter decreases. Since the inside and outside surfaces of the conical narrowing section 22 are conical, the narrowing section 22 also minimizes the thickness of the funnel liner 12 so that it may more easily be deformed, e.g., by the set screws 36.

Another alternative embodiment deletes the cylindrical section 20, having the collar 16 attached to the narrowing section 22. Contact between the support sleeve 14 and the funnel liner 12, if required, would be reduced to a circumferential line contact between the conical narrowing section 22 and the support sleeve 14. If additional contact area is needed, wedges could be used.

Still another alternative embodiment deletes the conical narrowing section 22 and the cylindrical section 20, the funnel liner having only an alternative collar section and an alternative guiding tube, both having a substantially cylindrical exterior surface. The outside diameter of the alternative guiding tube portion would be less than the inside diameter of the support sleeve 14, producing an annular space similar to the bottom gap or space 24. The inside surface of the alternative funnel liner would also be a smoothly narrowing geometry starting from an inlet orifice to an outlet orifice.

Still another alternative embodiment supports a funnel liner having a conical outside surface mating with a support sleeve having an inside conical supporting surface in place of the substantially horizontal top supporting ledge 18. Ridge members and grooves, e.g., similar to those shown in FIG. 1, could also be placed in the mating conical surfaces to allow periodic repositioning.

In the preferred embodiment shown in FIG. 2, the bottom surface of guiding tube 30 includes a circular delivery orifice or bottom aperture 32. The bottom aperture 32 is placed and sized to delivery the glass gobs to the gob scoop or other formable glass handling apparatus. If a flow of air is used to further accelerate or decelerate the glass gobs through the funnel, the shape of the bottom aperture 32 is altered commensurately. The accelerated (direction A on FIG. 1) or decelerated glass gobs pass from the receiving orifice 26 to the delivery orifice 32 through the conical well 28. The inlet orifice 26 and conical well 28 define the initial internal passageway that receives the hot glass gobs from the fore-hearth and guides them to the final straight guiding tube 30 portion that delivers the glass gobs to the gob scoop or other mold related apparatus.

The inside surfaces of both the conical well 28 and the straight guiding tube 30 are smooth and allow unobstructed passage of the glass gobs from the fore-hearth to the mold. Because of the high density and low friction properties of GLASSMATE-SR ®, the inside surfaces of the funnel liner 12 can have a relatively rough surface finish of about 250µ in. rms (6.35 microns, rms) without significant damage to some molded glass products, but a surface roughness in the range of about 63 to 125µ in. rms (1.60 to 3.18 microns, rms) is more typical.

The funnel assembly 10 is typically mounted substantially in a vertical orientation to facilitate the free passage of glass gobs. Vertical mounting allows the bearing ledge 18 to support the funnel liner 12 in the support sleeve 14 without further attachment means to secure the funnel liner 12 to the support sleeve 14. The cylindrical section 20 adds stability to the assembled funnel by allowing further support of the funnel liner 12 inside the support sleeve 14.

The funnel liner 12 extends downwardly into the support sleeve 14 and the location of the bottom aperture 32 delivering the glass gobs can be changed by adjusting the set screws 34 (shown in FIGS. 1 and 3) provided at the lower portion of the support sleeve 14. The delivery location of the glass gobs to the molds is adjusted by rotating the set screws 34 in threaded holes located in the support sleeve 14. Preferably, ¼ inch (6.35 mm) nominal diameter set screws are arranged circumferentially around the support sleeve 14 at different distances from the bottom of the support sleeve 14. The placement of set screws 34 around the circumference allows radial displacement of the delivery aperture 32. The placement of set screws 34 at different points along the length of the funnel assembly 10 allows access and bottom cut-off capability for different mold dimensions and fore-hearth to mold distances. Set screws 34 are preferably placed every 60 to 120 degrees around the funnel assembly 10 and along a portion of the length of the straight guiding tube 30 every 1 to 2 inches (2.54 to 5.08 cm).

Referring to FIG. 3, the support sleeve 14 of the funnel assembly 10 includes a hollow cylindrical tube 42 and a mounting flange 40. Common structural materials of construction may be used, such as plates or rolled sheet steel or tubes of low carbon steel or aluminum tubes. The inside diameter of the hollow cylindrical tube 42 is substantially the same as or slightly less than the outside diameter of the cylindrical section 20 of the funnel liner 12 if centering, lateral support, and/or contact is desired at this surface. Set screws 34 allow the operator to accurately position the delivery orifice 32 of the inserted funnel liner 12 over or into the mold even if the funnel liner 12 is firmly supported at the cylindrical section 20 and ledge 18.

The top edge of the support sleeve 14 includes an attached ridge member 46 that engages at least one of the grooves 36 in the funnel liner 12. The ridge member 46 is attached to the support sleeve 14 by screw 48 or similar conventional means, or it can be machined as a part of the top of the support sleeve 14.

A series of apertures 38, generally sized between 0.5 and 0.05 times the diameter of the cylindrical tube 42, allow hot air generated from contacting the funnel liner 12 to escape. The apertures 38 are located circumferentially around and along the length of the support sleeve 14, especially where the guiding tube 30 portion of the inserted funnel liner 12 in the assembled funnel assembly 10 normally is. Preferably, the apertures are about ¾ inch (1.905 cm) in diameter and spaced about every 1 inch (2.54 cm) along the length and about every 90 degrees around the circumference. Alternative aperture geometry and spacing are also possible, such as more closely spaced rectangular slots.

The funnel liner 12 can be rotated to allow more even wear of the liner's inside surfaces. When the funnel liner 12 is rotated, ridge member 46 engages one of the plurality of engagement slots on the funnel liner 12, thereby fixing the funnel liner 12 in a particular rendition determined by the user of the funnel assembly 10.

In the preferred embodiment of this invention, the collar has a series of grooves that are spaced sixty degrees apart and radially set the funnel liner in one circumferential orientation. If the funnel starts to show undue wear at any orientation, then the funnel liner can be rotated and the wear can be spaced over the entire internal area of the funnel liner.

Still other alternative embodiments of the invention are possible. For example: a gob scoop and/or trough composed of GLASSMATE-SR® having exterior surfaces (i.e., surfaces not contacting glass gobs) substantially in the absence of fins, baffles, and/or mechanically induced fluid flow: a funnel having a composite material of construction, such as a metal tubular portion substantially sandwiched with a graphite portion, to combine the separate functions of the liner and support sleeve; a modified funnel-like assembly used for intermittent extruding or drawing operations, e.g., a funnel and/or a plug assembly having an outside liner and a support for drawing glass tubing; a mold liner, e.g., plugging the delivery orifice of the funnel and splitting the assembly to create a conical mold; and a replaceable or detachable bottom tube portion attached to a narrowing portion 22 instead of the monolithic tube portion 30 that can be cut-off. In all of these alternative embodiments, the materials and shapes would allow the handling of hot glass substantially in the absence of mechanically driven cooling fluid flows across non-glass contacting surfaces and/or substantially in the absence of fins, baffles, or other cooling protrusion at these surfaces.

Although this invention has been primarily described by references to embodiments thereof, it is evident that the foregoing description suggests many alternatives, modifications, and variations to those skilled in the art. Accordingly, the spirit and scope of the appended claims are intended to embrace within the invention all such alternatives, modifications, and variations.

What is claimed is:

1. A graphite glass gob funnel liner comprising:
a monolithic piece of graphite having (a) a top collar portion terminating in a bearing ledge having a ridge-mating groove, and (b) a bottom tubular portion having an outer diameter less than the outer diameter of the collar portion with an internal passageway being defined by the collar portion and the tubular portion wherein said piece of graphite is capable of being supported by a holder having a ridged surface to mate with said bearing ledge.

2. The graphite glass gob funnel liner of claim 1 wherein a cylindrical portion is between the top collar portion and the bottom tubular portion.

3. The graphite glass gob funnel liner of claim 2 wherein the liner further comprises a conical portion below the cylindrical portion.

4. The graphite glass gob funnel liner of claim 1 wherein the liner further comprises an interior conical well for receiving glass gobs.

5. The graphite glass gob funnel liner of claim 1 wherein the external passageway is conically shaped narrowing downwardly.

6. The graphite funnel of claim 1 wherein the ratio of the collar outer diameter to the collar height is between 2 and 4.

7. The graphite funnel of claim 1 wherein the bearing ledge is between 2% and 10% of the collar outer diameter.

8. The graphite funnel of claim 2 wherein the cylindrical portion has an outer diameter between 85% and 95% the outer diameter of the collar portion.

9. A graphite glass gob funnel assembly comprising:
an outer cylindrical support sleeve having an outer diameter and a ridge member on its top edge and;
an inner, substantially tube-shaped, monolithic piece of graphite having a collar portion having an outer diameter between 110% and 95% the outer diameter of the support sleeve outer diameter, the collar portion resting on the upper edge of the support sleeve
and wherein the graphite has a plurality of grooves in the collar portion that matingly engage the ridge member of said support sleeve.

10. The glass gob assembly of claim 9 wherein the support sleeve defines a series of apertures located at a gap between the support sleeve and the funnel liner to allow hot air generated by the passage of glass gobs to escape from the gap.

11. A graphite article comprising:
a substantially tubular body defined on the exterior by (a) a top collar portion having an outer diameter and a length, said top collar portion terminating at the bottom of its length in a ledge having a ridge-mating groove, and (b) a bottom conical portion; said body further defining an interior surface forming a tubular passageway from the top end of the top collar portion to the bottom end of the bottom conical portion defined by an interior diameter greater at the top end than at the bottom end.

12. The graphite article of claim 11 wherein the collar has at least one radial groove along the ledge.

13. The graphite article of claim 11 wherein the interior surface defines a downwardly narrowing conical surface that terminates in a cylindrical surface.

14. The graphite article of claim 11 wherein the article further defines a top surface having an opening to the interior surface.

15. The graphite article of claim 11 wherein the collar length is less than one fourth the length of the entire tubular body.

16. The graphite article of claim 11 wherein the bottom conical portion terminates in a cylindrical portion having a constant outer diameter extending downwardly.

17. An apparatus for handling formable glass at a temperature of at least about 800° C. comprising:
an internal passageway extending from an entry to a second location, wherein said passageway is capable of handling said formable glass from said entry location to said second location distal from said entry location;

an exterior surface substantially free of cooling protrusions; and wherein said apparatus is substantially composed of a material capable of handling said formable glass in the absence of a cooling fluid flow driven by mechanical means and wherein said apparatus is also capable of being supported in a plurality of adjustable positions by a holder having a non-planar surface.

18. An apparatus for handling formable glass at a temperature of at least about 800° C. comprising:

an internal passageway extending from an entry to a second location, wherein said passageway is capable of handling said formable glass from said entry location to said second location distal from said entry location;

an exterior surface substantially free of cooling protrusions; and wherein said apparatus is substantially composed of a material capable of handling said formable glass in the absence of a cooling fluid flow driven by mechanical means and wherein said apparatus is also capable of being supported in a plurality of adjustable positions, wherein said passageway narrows in a substantially continuous manner from a location proximate to said entry location to said second location, forming a funnel, wherein said funnel is substantially composed of a material having a thermal conductivity of at least 50 BTU-ft/ft$^2$-hr-°F., wherein said funnel is assemblable into a funnel assembly which also comprises:

means for deforming the shape of said passageway; and means for supporting said funnel, and wherein said means for supporting and said means for deforming comprise a plurality of adjustable position supports.

19. The funnel assembly claimed in claim 18 which also comprises means for repositioning said internal passageway with respect for said means for supporting said liner.

20. The funnel assembly claimed in claim 19 wherein said means for repositioning comprises:

at least one protrusion on said means for supporting; and a plurality of indentations on said funnel mating with said protrusion in a plurality of rotated positions.

21. The funnel assembly claimed in claim 19 said means for repositioning comprises:

at least one protrusion on said funnel; and a plurality of indentations on said means for supporting mating with said protrusion in a plurality of rotated positions.

22. The funnel assembly claimed in claim 20 which also comprises a plurality of apertures in said means for supporting providing a conduit for ambient air to contact a portion of said funnel.

23. The funnel assembly claimed in claim 22 wherein said funnel is capable of accepting said formable glass discharged from a fore-hearth at an upper aperture to said internal passageway and delivering said formable glass to a portion of a forming machine through a lower passageway aperture substantially located the length of the funnel below said upper aperture and wherein said means for supporting is a sleeve attachable to said forming machine.

24. The funnel assembly claimed in claim 23 wherein said adjustable position supports are located at a plurality of circumferential positions and axial positions along said length of said funnel.

25. The funnel claimed in claim 24 wherein the distance between said fore-hearth and said molding machine portion is variable from about 15 to 61 cm and wherein said funnel is also capable of being cut off and delivering said moldable glass over a smaller range of said variable distance.

26. The funnel claimed in claim 25 wherein said internal passageway is shaped substantially as a conical frustrum having a cone angle of at least 6 degrees.

27. The funnel claimed in claim 26 wherein said funnel comprises a graphite liner having a flexural strength at room temperature of at least about 8800 psi, a thermal conductivity at room temperature of at least about 70 BTU-ft/ft$^2$-hr-°F., and a density of at least about 1.8 g/cc.

28. The funnel assembly claimed in claim 27 wherein a portion of said support means is spaced apart from said funnel along a majority of said length.

29. The funnel assembly claimed in claim 28 wherein said average spaced apart distance along a majority of said length is at least about 0.31 cm.

30. The funnel assembly claimed in claim 29 which also comprises a means for supplying a flow of fluid to substantially only the interior surface of said funnel.

31. The process of molding glass which comprises:

heating said glass in a furnace;

releasing at least a portion of said heated glass from said furnace to a funnel;

funnel diverting said released glass from a vertical path in the absence of a cooling fluid stream having a velocity of greater than 2 feet per second in thermal contact with said funnel;

discharging said funnel diverted glass to a molding machine; and rotatably repositioning said funnel with respect to said molding machine after said discharging step.

32. The process of claim 31 wherein said rotatably repositioning step is accomplished periodically at an interval of no less than 180 days.

33. The process of claim 30 which also comprises the step of deforming said funnel after said discharging step.

34. The process of claim 33 which after said discharging step also comprises the steps of:

cutting off a portion of said funnel; and second heating an additional amount of glass in said furnace;

second releasing at least a portion of said second heated glass from said furnace to said funnel;

second funnel diverting said second released glass from a vertical path in the absence of a cooling fluid stream having a velocity of greater than 2 feet per second in thermal contacting with said funnel; and second discharging said second funnel diverted glass to a molding machine.

35. A monolithic graphite funnel having an internal passageway, said funnel comprising:

a top collar portion terminating in a lower bearing ledge having an outer top collar diameter;

a bottom tubular portion attached to said top collar portion and having an outer diameter less than said outer top collar diameter, wherein said graphite funnel is capable of contacting a molten glass gob within said passageway in the absence of a cooling liquid contacting the exterior portion of said funnel; and ridge and groove means for supporting said graphite funnel.

* * * * *

UNITED STATES PATENT AND TRADEMARK OFFICE
CERTIFICATE OF CORRECTION

PATENT NO.   :   5,394,910
DATED        :   March 7, 1995
INVENTOR(S)  :   James E. Sweetland It is certified that error appears in the above-identified patent and that said Letters Patent is hereby corrected as shown below:

Column 12, claim 5, line 8, delete "external" and insert therefor -- internal --.

Column 12, claim 14, line 52-54 , claim 14.

Column 13, claim 21, line 49, after "claim 19" insert -- wherein --.

Column 14, claim 33, line 40, replace "30" with -- 31 --.

Signed and Sealed this

Fifth Day of March, 1996

Attest:

BRUCE LEHMAN

Attesting Officer

Commissioner of Patents and Trademarks